US012445648B2

(12) United States Patent
Damnjanovic

(10) Patent No.: US 12,445,648 B2
(45) Date of Patent: *Oct. 14, 2025

(54) DATA PROCESSING APPARATUSES, METHODS, COMPUTER PROGRAMS AND COMPUTER-READABLE MEDIA

(71) Applicant: V-NOVA INTERNATIONAL LIMITED, London (GB)

(72) Inventor: Ivan Damnjanovic, London (GB)

(73) Assignee: V-NOVA INTERNATIONAL LIMITED, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 18/627,223

(22) Filed: Apr. 4, 2024

(65) Prior Publication Data
US 2024/0406452 A1 Dec. 5, 2024

Related U.S. Application Data

(63) Continuation of application No. 17/237,303, filed on Apr. 22, 2021, now Pat. No. 11,962,805, which is a
(Continued)

(30) Foreign Application Priority Data

Sep. 8, 2016 (GB) .................... 16152662

(51) Int. Cl.
H04N 19/60 (2014.01)
H04N 19/126 (2014.01)
(Continued)

(52) U.S. Cl.
CPC ........... *H04N 19/60* (2014.11); *H04N 19/126* (2014.11); *H04N 19/33* (2014.11); *H04N 19/40* (2014.11); *H04N 19/50* (2014.11); *H04N 19/59* (2014.11)

(58) Field of Classification Search
CPC ...... H04N 19/60; H04N 19/126; H04N 19/33; H04N 19/40; H04N 19/50; H04N 19/59
See application file for complete search history.

(56) References Cited

U.S. PATENT DOCUMENTS 7,668,722 B2  2/2010  Villemoes
8,346,564 B2  1/2013  Hotho
(Continued)

FOREIGN PATENT DOCUMENTS

EP      739140       10/1996
WO   2013-171173    11/2013
WO   2014-170819    10/2014

OTHER PUBLICATIONS

"Algorithm description of Joint Exploration Test Model 3 (JEM3)", 115, MPEG Meeting, May 30, 2016-Jun. 3, 2016, Geneva, (Motion Picture Expert Group or ISO/IEC JTC1/SC29/WG11), No. n16276, Aug. 8, 2016, XP030269803, retrieved on Aug. 8, 2016 via http://phenix.int-evry.fr/mpeg/doc_end_user/documents/115_Geneva/wg11/w16276.zipw16276.docx.
(Continued)

*Primary Examiner* — Gregory M Desire
(74) *Attorney, Agent, or Firm* — Workman Nydegger

(57) ABSTRACT

First and second pluralities of residual elements useable to reconstruct first and second respective parts of a representation of a signal are obtained. A transformation operation is performed to generate at least one correlation element. The transformation operation involves at least one residual element in the first plurality and at least one residual element in the second plurality. The at least one correlation element is dependent on an extent of correlation between the at least one residual element in the first plurality and the at least one residual element in the second plurality. The transformation operation is performed prior to the at least one correlation element being encoded.

18 Claims, 4 Drawing Sheets

Related U.S. Application Data continuation of application No. 16/295,851, filed on Mar. 7, 2019, now Pat. No. 10,992,959, which is a continuation of application No. PCT/GB2017/052632, filed on Sep. 8, 2017.

(51) Int. Cl.
*H04N 19/33* (2014.01)
*H04N 19/40* (2014.01)
*H04N 19/50* (2014.01)
*H04N 19/59* (2014.01)

(56) References Cited

U.S. PATENT DOCUMENTS

| | | | | |
|---|---|---|---|---|
| 9,699,452 | B2* | 7/2017 | Ye | H04N 19/176 |
| 9,700,284 | B2 | 7/2017 | Kapoor | |
| 9,792,664 | B2* | 10/2017 | Gupta | G06T 7/246 |
| 9,986,248 | B2* | 5/2018 | Pu | H04N 19/593 |
| 10,333,547 | B2* | 6/2019 | Kalevo | H04N 19/119 |
| 11,290,751 | B2* | 3/2022 | Gamei | H04N 19/91 |
| 2006/0120450 | A1 | 6/2006 | Han et al. | |
| 2006/0233254 | A1 | 10/2006 | Lee et al. | |
| 2008/0247462 | A1 | 10/2008 | Demos | |
| 2009/0238279 | A1 | 9/2009 | Tu et al. | |
| 2012/0063512 | A1 | 3/2012 | Han et al. | |
| 2013/0314496 | A1 | 11/2013 | Rossato et al. | |

OTHER PUBLICATIONS

Anonymous: "dctmtx()-Image Processing", WikiDev, Sep. 3, 2016. https://wikidev.in/wiki/matlab/image_processing/ dctmtx.
International Search Report and Written Opinion mailed Jan. 8, 2018 for PCT Application No. PCT/GB2017/052632.
UKIPO Search Report dated Feb. 28, 2017 for Application No. GB1615266.2.
U.S. Appl. No. 17/237,303, Aug. 31, 2023, Non-Final Rejection.
U.S. Appl. No. 17/237,303, Dec. 18, 2023, Notice of Allowance.
U.S. Appl. No. 17/237,303, Mar. 27, 2024, Issue Notification.
U.S. Appl. No. 16/295,851, Oct. 16, 2020, Non-Final Rejection.
U.S. Appl. No. 16/295,851, Dec. 23, 2020, Notice of Allowance.
U.S. Appl. No. 16/295,851, Apr. 7, 2021, Issue Notification.

* cited by examiner

DATA PROCESSING APPARATUSES, METHODS, COMPUTER PROGRAMS AND COMPUTER-READABLE MEDIA

CROSS-REFERENCE TO RELATED APPLICATIONS

This application is a continuation of U.S. application Ser. No. 17/237,303, filed Apr. 22, 2021, which is a continuation of U.S. application Ser. No. 16/295,851, filed Mar. 7, 2019 (which issued as U.S. Pat. No. 10,992,959), which is a continuation of International Application No. PCT/GB2017/052632, filed Sep. 8, 2017, which claims priority to UK Application No. GB1615266.2, filed Sep. 8, 2016, under 35 U.S.C. § 119 (a). Each of the above-referenced patent applications is incorporated by reference in its entirety.

BACKGROUND OF THE INVENTION

Field of the Invention

The present invention relates to data processing apparatuses, methods, computer programs and computer-readable media.

Compression and decompression of signals is an important consideration in many known systems.

Many types of signal, for example video, audio or volumetric signals, may be compressed and encoded for transmission, for example over a data communications network. Other signals may be stored in a compressed form, for example on a storage medium such as a Digital Versatile Disc (DVD). When such a signal is decoded, it may be desired to increase a level of quality of the signal and/or recover as much of the information contained in the original signal as possible.

Some known systems exploit scalable encoding techniques. Scalable encoding involves encoding a signal along with information to allow the reconstruction of the signal at different levels of quality, depending on the capabilities of the decoder and the available bandwidth. However, relatively large amounts of information may need to be stored and/or transmitted, particularly as the usage of higher quality, higher definition video becomes more widespread.

BRIEF SUMMARY OF THE INVENTION

According to a first aspect of the present invention, there is provided apparatus configured to: obtain a first plurality of residual elements useable to reconstruct a first part of a first representation of a signal at a relatively high level of quality using a first part of a second representation of the signal at the relatively high level of quality, the first part of the second representation being derivable from a first set of one or more signal elements in a representation of the signal at a relatively low level of quality; obtain a second plurality of residual elements useable to reconstruct a second, different part of the first representation of the signal using a second, different part of the second representation of the signal, the second part of the second representation being derivable from a second, different set of one or more signal elements in the representation of the signal at the relatively low level of quality; and perform at least one transformation operation involving at least one residual element in the first plurality of residual elements and at least one residual element in the second plurality of residual elements to generate at least one correlation element, the at least one correlation element being dependent on an extent of correlation between the at least one residual element in the first plurality of residual elements and the at least one residual element in the second plurality of residual elements, wherein the apparatus is configured to perform the at least one transformation operation prior to the at least one correlation element being encoded.

According to a second aspect of the present invention, there is provided apparatus configured to: perform at least one transformation operation involving at least one correlation element to generate at least one residual element in a first plurality of residual elements and at least one residual element in a second plurality of residual elements, the at least one correlation element being dependent on an extent of correlation between the at least one residual element in the first plurality of residual elements and the at least one residual element in the second plurality of residual elements, the first plurality of residual elements being useable to reconstruct a first part of a first representation of a signal at a relatively high level of quality using a first part of a second representation of the signal at the relatively high level of quality, the second plurality of residual elements being useable to reconstruct a second, different part of the first representation of the signal using a second, different part of the second representation of the signal; derive the first part of the second representation from a first set of one or more signal elements in a representation of the signal at a relatively low level of quality; derive the second part of the second representation from a second, different set of one or more signal elements in the representation of the signal at the relatively low level of quality; and use at least the first plurality of residual elements, the second plurality of residual elements, the first part of the second representation and the second part of the second representation to generate output data, wherein the apparatus is configured to perform the at least one transformation operation following the at least one correlation element being decoded.

According to a third aspect of the present invention, there is provided a method comprising: obtaining a first plurality of residual elements useable to reconstruct a first part of a first representation of a signal at a relatively high level of quality using a first part of a second representation of the signal at the relatively high level of quality, the first part of the second representation being derivable from a first set of one or more signal elements in a representation of the signal at a relatively low level of quality; obtaining a second plurality of residual elements useable to reconstruct a second, different part of the first representation of the signal using a second, different part of the second representation of the signal, the second part of the second representation being derivable from a second, different set of one or more signal elements in the representation of the signal at the relatively low level of quality; and performing at least one transformation operation involving at least one residual element in the first plurality of residual elements and at least one residual element in the second plurality of residual elements to generate at least one correlation element, the at least one correlation element being dependent on an extent of correlation between the at least one residual element in the first plurality of residual elements and the at least one residual element in the second plurality of residual elements, wherein the at least one transformation operation is performed prior to the at least one correlation element being encoded.

According to a fourth aspect of the present invention, there is provided a method comprising: performing at least one transformation operation involving at least one correlation element to generate at least one residual element in a first plurality of residual elements and at least one residual element in a second plurality of residual elements, the at least one correlation element being dependent on an extent of correlation between the at least one residual element in the first plurality of residual elements and the at least one residual element in the second plurality of residual elements, the first plurality of residual elements being useable to reconstruct a first part of a first representation of a signal at a relatively high level of quality using a first part of a second representation of the signal at the relatively high level of quality, the second plurality of residual elements being useable to reconstruct a second, different part of the first representation of the signal using a second, different part of the second representation of the signal; deriving the first part of the second representation from a first set of one or more signal elements in a representation of the signal at a relatively low level of quality; deriving the second part of the second representation from a second, different set of one or more signal elements in the representation of the signal at the relatively low level of quality; and using at least the first plurality of residual elements, the second plurality of residual elements, the first part of the second representation and the second part of the second representation to generate output data, wherein the at least one transformation operation is performed following the at least one correlation element being decoded.

According to a fifth aspect of the present invention, there is provided a computer program comprising instructions which, when executed, cause an apparatus to perform a method comprising: obtaining a first plurality of residual elements useable to reconstruct a first part of a first representation of a signal at a relatively high level of quality using a first part of a second representation of the signal at the relatively high level of quality, the first part of the second representation being derivable from a first set of one or more signal elements in a representation of the signal at a relatively low level of quality; obtaining a second plurality of residual elements useable to reconstruct a second, different part of the first representation of the signal using a second, different part of the second representation of the signal, the second part of the second representation being derivable from a second, different set of one or more signal elements in the representation of the signal at the relatively low level of quality; and performing at least one transformation operation involving at least one residual element in the first plurality of residual elements and at least one residual element in the second plurality of residual elements to generate at least one correlation element, the at least one correlation element being dependent on an extent of correlation between the at least one residual element in the first plurality of residual elements and the at least one residual element in the second plurality of residual elements, wherein the at least one transformation operation is performed prior to the at least one correlation element being encoded.

According to a sixth aspect of the present invention, there is provided a computer program comprising instructions which, when executed, cause an apparatus to perform a method comprising: performing at least one transformation operation involving at least one correlation element to generate at least one residual element in a first plurality of residual elements and at least one residual element in a second plurality of residual elements, the at least one correlation element being dependent on an extent of correlation between the at least one residual element in the first plurality of residual elements and the at least one residual element in the second plurality of residual elements, the first plurality of residual elements being useable to reconstruct a first part of a first representation of a signal at a relatively high level of quality using a first part of a second representation of the signal at the relatively high level of quality, the second plurality of residual elements being useable to reconstruct a second, different part of the first representation of the signal using a second, different part of the second representation of the signal; deriving the first part of the second representation from a first set of one or more signal elements in a representation of the signal at a relatively low level of quality; deriving the second part of the second representation from a second, different set of one or more signal elements in the representation of the signal at the relatively low level of quality; and using at least the first plurality of residual elements, the second plurality of residual elements, the first part of the second representation and the second part of the second representation to generate output data, wherein the at least one transformation operation is performed following the at least one correlation element being decoded.

DETAILED DESCRIPTION OF THE INVENTION

Figure 1:
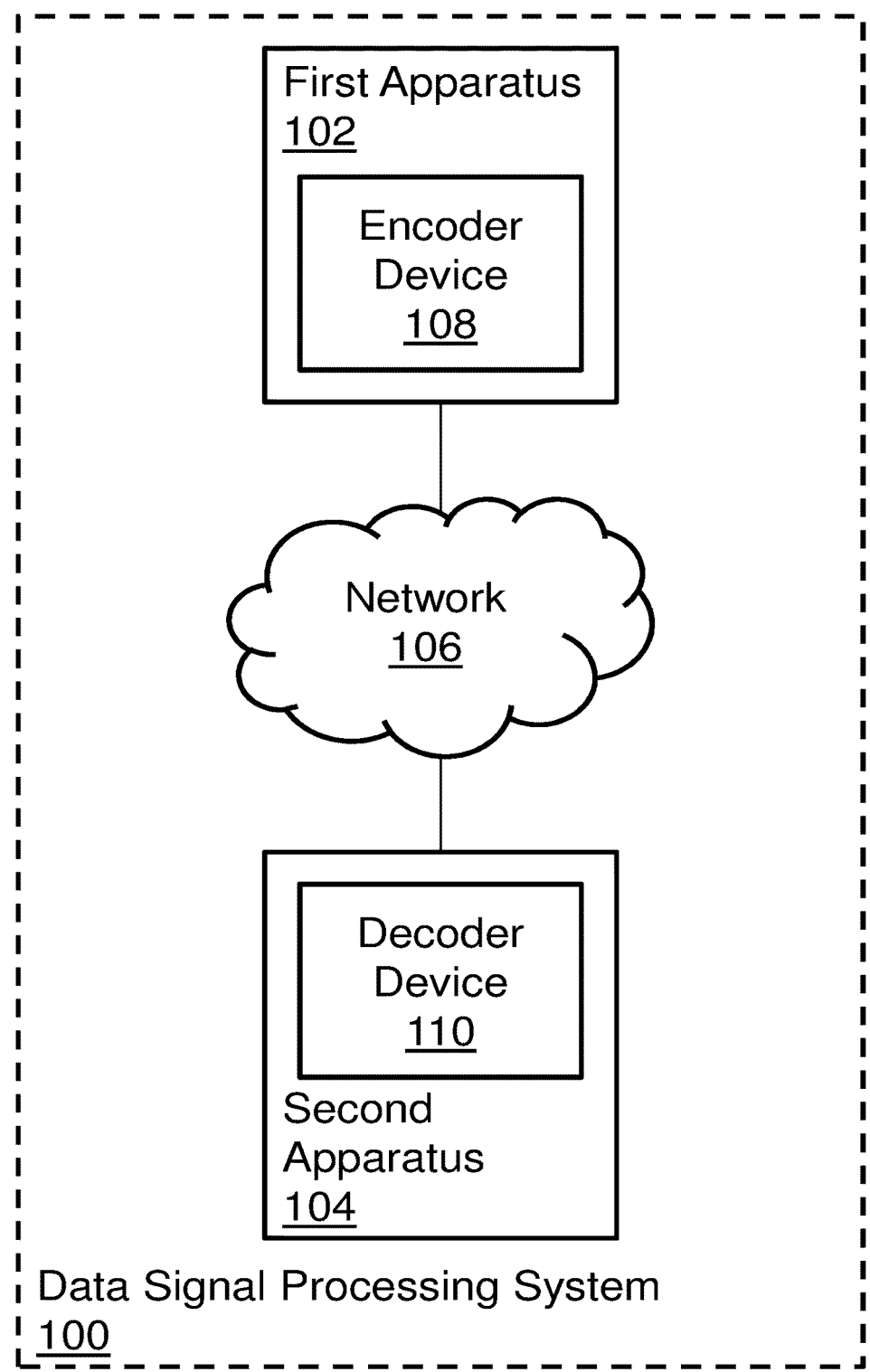
FIG. 1 shows a schematic block diagram of an example of a signal processing system in accordance with an embodiment of the present invention.

Referring to FIG. 1, there is shown an example of a signal processing system 100. The signal processing system 100 is used to process signals. Examples of types of signal include, but are not limited to, video signals, image signals, audio signals, volumetric signals such as those used in medical, scientific or holographic imaging, or other multidimensional signals.

The signal processing system 100 includes a first apparatus 102 and a second apparatus 104. The first apparatus 102 and second apparatus 104 may have a client-server relationship, with the first apparatus 102 performing the functions of a server device and the second apparatus 104 performing the functions of a client device. The signal processing system 100 may include at least one additional apparatus. The first apparatus 102 and/or second apparatus 104 may comprise one or more components. The components may be implemented in hardware and/or software. The one or more components may be co-located or may be located remotely from each other in the signal processing system 100. Examples of types of apparatus include, but are not limited to, computerised devices, routers, workstations, handheld or laptop computers, tablets, mobile devices, games consoles, smart televisions, set-top boxes, etc.

The first apparatus 102 is communicatively coupled to the second apparatus 104 via a data communications network 106. Examples of the data communications network 106 include, but are not limited to, the Internet, a Local Area Network (LAN) and a Wide Area Network (WAN). The first and/or second apparatus 102, 104 may have a wired and/or wireless connection to the data communications network 106.

The first apparatus 102 comprises an encoder device 108. The encoder device 108 is configured to encode signal data. The encoder device 108 may perform one or more further functions in addition to encoding signal data. The encoder device 108 may be embodied in various different ways. For example, the encoder device 108 may be embodied in hardware and/or software.

The second apparatus 104 comprises a decoder device 110. The decoder device 110 is configured to decode signal data. The decoder device 110 may perform one or more further functions in addition to decoding signal data. The decoder device 110 may be embodied in various different ways. For example, the decoder device 110 may be embodied in hardware and/or software.

The encoder device 108 encodes signal data and transmits the encoded signal data to the decoder device 110 via the data communications network 106. The decoder device 110 decodes the received, encoded signal data and generates decoded signal data. The decoder device 110 may output the decoded signal data, or data derived using the decoded signal data. For example, the decoder device 110 may output such data for display on one or more display devices associated with the second apparatus 104.

In some examples described herein, the encoder device 108 transmits to the decoder device 110 a representation of a signal at a given level of quality and information the decoder device 110 can use to reconstruct a representation of the signal at one or more higher levels of quality.

Compared to some known techniques, the examples described herein involve transmitting a relatively small amount of information to be used for such reconstruction. This reduces the amount of data transmitted via the data communications network 106. The savings may be particularly relevant where the signal data corresponds to high quality video data, where the amount of information transmitted in known systems can be especially high.

Examples described herein facilitate more selective encoding of the information the decoder device 110 uses to reconstruct the representation of the signal at the one or more higher levels of quality. In particular, examples described herein convert such information into a form that allows fine-grained control over encoding of individual data elements. This facilitates more efficient and effective encoding, for example where the encoding takes into account the relative importance of the data elements being encoded.

Figure 2:
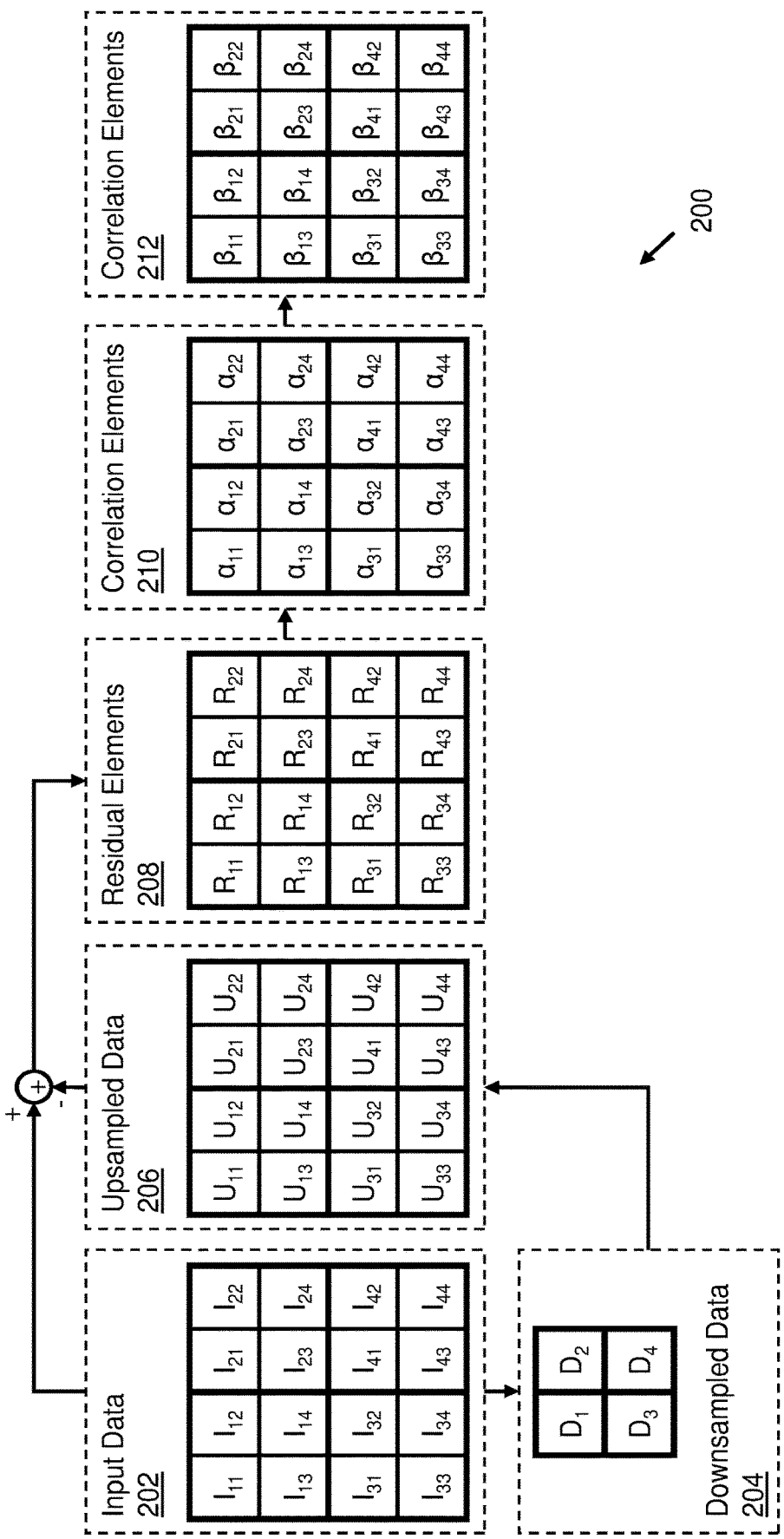
FIG. 2 shows a schematic diagram of an example of a signal processing technique in accordance with an embodiment of the present invention.

Referring to FIG. 2, there is shown schematically an example of a signal processing technique 200. The signal processing technique 200 may be performed by the first apparatus 102.

The first apparatus 102 obtains input data 202. For example, the first apparatus 102 may receive the input data 202 from one or more other entities.

The input data 202 comprises a representation of a signal at a relatively high level of quality. The relatively high level of quality is high relative to one or more other levels of quality in a tiered hierarchy having multiple different levels of quality. The relatively high level of quality may be the highest level of quality in the tiered hierarchy or may be an intermediate level of quality.

In this example, the input data 202 is arranged as a 4×4 array of signal elements comprising four rows and four columns of signal elements. The input data 202 may for example comprise an image and each of the signal elements may represent a pixel comprised in the image.

In this example, the input data 202 comprises four sets of signal elements. A signal element $I_{ij}$ corresponds to the $j^{th}$ signal element in the $i^{th}$ set of signal elements in the input data 202. The different sets of signal elements may correspond to different regions of some or all of an image, for example where the input data 202 comprises image or video data.

The input data 202 is processed to generate data 204 based on the input data 202. In this example, the data 204 is generated by downsampling the input data 202 and is therefore referred to as "downsampled data".

In this example, the downsampled data 204 is arranged as a 2×2 array comprising four signal elements. A downsampled signal element $D_i$ corresponds to a downsampled version of the $i^{th}$ set of signal elements in the input data 202.

The downsampled data 204 is a representation of the signal at a relatively low level of quality. The relatively low level of quality is low relative to one or more other levels of quality in the tiered hierarchy having multiple different levels of quality. The relatively low level of quality may be the lowest level of quality in the tiered hierarchy or may be an intermediate level of quality.

The downsampled data 204 is processed to generate data 206. In this example, the data 206 is obtained by upsampling the downsampled data 204 and is therefore referred to as "upsampled data".

In this example, the upsampled data 206 is arranged as a 4×4 array of signal elements comprising four rows and four columns of signal elements. The upsampled data 206 comprises four sets of signal elements. In this example, each of the sets of signal elements is a 2×2 array of signal elements. A signal element $U_{ij}$ corresponds to the $j^{th}$ signal element in the $i^{th}$ set of signal elements in the upsampled data 206. The upsampled data 206 is based on a representation of the signal at a relatively low level of quality, namely the downsampled data 204.

The input data 202 and the upsampled data 206 are used to obtain a set of residual elements 208. The set of residual elements 208 is arranged as a 4×4 array of signal elements comprising four rows and four columns of signal elements. In this example, the set of residual elements 208 comprises four groups of residual elements. Each of the groups of residual elements comprises a plurality of residual elements. In this example, each group of residual elements is a 2×2 array of residual elements. A residual element $R_{ij}$ corresponds to the $j^{th}$ residual element in the $i^{th}$ group of residual elements in the set of residual elements 208.

In this example, a given residual element in the set of residual elements 208 is obtained by comparing a value of a signal element in the upsampled data 206 with a value of a corresponding signal element in the input data 202.

As such, the first apparatus 102 obtains a first plurality of residual elements, for example residual elements $R_{11}$, $R_{12}$, $R_{13}$, $R_{14}$. In this example, obtaining the first plurality of residual elements involves the first apparatus 102 generating or deriving the first plurality of residual elements, for example using the input data 202 and the upsampled data 206. In other examples, obtaining the first plurality of residual elements may involve the first apparatus 102 receiving the first plurality of residual elements or data useable to derive the first plurality of residual elements.

The first apparatus 102 also obtains a second plurality of residual elements, for example residual elements $R_{21}$, $R_{22}$, $R_{23}$, $R_{24}$. In this example, obtaining the second plurality of residual elements involves the first apparatus 102 generating or deriving the second plurality of residual elements, for example using the input data 202 and the upsampled data 206. In other examples, obtaining the second plurality of residual elements may involve the first apparatus 102 receiving the second plurality of residual elements or data useable to derive the second plurality of residual elements.

The set of residual elements 208 is useable in combination with the upsampled data 206 to reconstruct the input data 202. For example, the comparison between the input data 202 and the upsampled data 206 that is used to determine the set of residual elements 208 may be reversed such that the input data 202 can be obtained by comparing the upsampled data 206 with the set of residual elements 208.

As such, the first plurality of residual elements is useable to reconstruct a first part of a first representation of a signal at the relatively high level of quality using a first part of a second representation of the signal at the relatively high level of quality. For example, residual elements $R_{11}$, $R_{12}$, $R_{13}$, $R_{14}$ are usable to reconstruct the part of the input data 202 consisting of signal elements $I_1$, $I_{12}$, $I_{13}$, $I_{14}$ using the part of the upsampled data 206 consisting of signal elements $U_{11}$, $U_{12}$, $U_{13}$, $U_{14}$. The input data 202 and the upsampled data 206 are both at the relatively high level of quality. The reconstruction may take place at the first apparatus 102, at the second apparatus 104 or elsewhere. The first part of the second representation is derivable from a first set of one or more signal elements in a representation of the signal at the relatively low level of quality. For example, the part of the upsampled data 206 consisting of signal elements $U_{11}$, $U_{12}$, $U_{13}$, $U_{14}$ is derivable from signal element $D_1$ in the downsampled data 204. The downsampled data 204 is a representation of the signal at the relatively low level of quality. The first set of one or more signal elements in the representation of the signal at the relatively low level of quality would, in this example, consist solely of signal element $D_1$.

The second plurality of residual elements is useable to reconstruct a second part of the first representation of the signal at the relatively high level of quality using a second, different part of the second representation of the signal at the relatively high level of quality. For example, residual elements $R_{21}$, $R_{22}$, $R_{23}$, $R_{24}$ are usable to reconstruct the part of the input data 202 consisting of signal elements $I_{21}$, $I_{22}$, $I_{23}$, $I_{24}$ using the part of the upsampled data 206 consisting of signal elements $U_{21}$, $U_{22}$, $U_{23}$, $U_{24}$. The reconstruction may take place at the first apparatus 102, at the second apparatus 104 or elsewhere. The second part of the second representation is derivable from a second, different set of one or more signal elements in the representation of the signal at the relatively low level of quality. For example, the part of the upsampled data 206 consisting of signal elements $U_{21}$, $U_{22}$, $U_{23}$, $U_{24}$ is derivable from signal element $D_2$ in the downsampled data 204. The downsampled data 204 is a representation of the signal at the relatively low level of quality. The second set of one or more signal elements in the representation of the signal at the relatively low level of quality would, in this example, consist solely of signal element $D_2$.

The first and second parts of the second representation of the signal at the relatively high level of quality may be different in that at least one of the first and second parts comprises at least one signal element that is not in the other of the first and second parts. The first and second parts of the second representation of the signal at the relatively high level of quality may be different in that the first and second parts do not comprise any signal elements in common.

The first and second sets of one or more signal elements in the representation of the signal at the relatively low level of quality may be different in that at least one of the first and second sets comprises at least one signal element that is not in the other of the first and second sets. The first and second sets of one or more signal elements in the representation of the signal at the relatively low level of quality may be different in that the first and second sets do not comprise any signal elements in common.

The set of residual elements 208 may be transmitted to the second apparatus 104 to allow the second apparatus 104 to reconstruct the input data 202. The set of residual elements 208 may be encoded prior to transmission to reduce the amount of data involved in transmitting the set of residual elements 208 to the second apparatus 104.

In examples described herein, a set of correlation elements 210 is derived by performing at least one transformation operation involving at least some residual elements in the set of residual elements 208. The reader is referred to international patent application no. PCT/EP2013/059847, which published as WO2013/171173, PCT/EP2013/059847 describes decomposition of residual data in a tiered hierarchy. The entire contents of PCT/EP2013/059847 are incorporated herein by reference.

As such, the first apparatus 102 performs at least one transformation operation. Multiple transformation operations may be performed, for example in series and/or in parallel.

The at least one transformation operation involves at least one residual element in the first plurality of residual elements, $R_{11}$, $R_{12}$, $R_{13}$, $R_{14}$, and at least one residual element in the second plurality of residual elements, $R_{21}$, $R_{22}$, $R_{23}$, $R_{24}$. The at least one transformation operation may involve multiple residual elements in the first plurality of residual elements, $R_{11}$, $R_{12}$, $R_{13}$, $R_{14}$, and/or multiple residual elements in the second plurality of residual elements, $R_{21}$, $R_{22}$, $R_{23}$, $R_{24}$. The at least one residual element in the first plurality of residual elements, $R_{11}$, $R_{12}$, $R_{13}$, $R_{14}$, and the at least one residual element in the second plurality of residual elements, $R_{21}$, $R_{22}$, $R_{23}$, $R_{24}$, may be inputs to the at least one transformation operation.

The at least one transformation operation may comprise at least one directional decomposition operation. A directional decomposition operation may exploit correlation. For example, a directional decomposition operation may exploit directional (or 'spatial') correlation. This can lead to more efficient encoding, especially when there is a high degree of such correlation. A directional decomposition operation may result in a set of directional components. Different directional components may be encoded using different encoding parameters, for example according to the relative importance of different directional components in terms of perceived quality. Some directional components may therefore be encoded differently compared to other directional components without a noticeable difference in visual quality. This facilitates more selective encoding, for example to take account of the importance of the individual directional components. In some examples, the precision of encoding of some directional components is increased compared to the precision of encoding of other directional components, for example according to differences in perceptual importance. In some examples, some directional components undergo more compression compared to other directional components. In some examples, some directional components are allocated more bitrate compared to other directional components, for example according to differences in perceptual importance between different directional components. The reader is referred to international patent application no. PCT/EP2013/059847 for examples of how directional decomposition components may be prioritised and encoded.

As is described in more detail below, multiple directional decomposition operations may be performed to further exploit correlation between different sets and types of data elements. This may also lead to more efficient encoding by providing more flexibility in terms of how individual data elements are encoded by allowing groups of data elements that may otherwise all be encoded using the same encoder settings to be decoupled from each other.

In this example, the set of correlation elements 210 is arranged as a 4×4 array of correlation elements comprising four rows and four columns of signal elements. In this example, the set of correlation elements 210 comprises four groups of correlation elements. Each of the groups of correlation elements comprises a plurality of correlation elements. In this example, each group of correlation elements is a 2×2 array of correlation elements. A correlation element $\alpha_{ij}$ corresponds to the $j^{th}$ correlation element in the $i_{th}$ group of correlation elements in the set of correlation elements 210.

The set of correlation elements 210 may be derived by pre-multiplying the set of residual elements 208 with a first transformation (or 'transform') matrix (or 'kernel'), $K_1$. This may be written as $\alpha=K_1 \cdot R$, where a represents the set of correlation elements 210 and R represents the set of residual elements 208.

Instead of deriving the set of correlation elements 210 by pre-multiplying the entire set of residual elements 208 with a single first transformation matrix, smaller groups of residual elements in the set of residual elements 208 could be pre-multiplied by respective smaller first transformation matrices. Using smaller matrices may result in more efficient processing than using a single, larger matrix since fewer calculations may be performed.

As such, the at least one transformation operation may comprise at least one mathematical operation. The at least one transformation operation may comprise at least one matrix multiplication operation. The at least one transformation operation may comprise at least one linear combination operation. For example, the at least one linear combination operation may be used instead of the at least one matrix multiplication operation. As such, the data to be encoded may be arranged in a form that can lead to encoding in a more efficient and well-defined manner In some examples, some or all of the correlation elements $\alpha_{ij}$ in the set of correlation elements 210 are derived based on residual elements from only one of the pluralities of residual elements in the set of residual elements 208. Such correlation elements $\alpha_{ij}$ may be indicative of an extent of correlation between the residual elements on which they are based.

The set of correlation elements 210 may exploit correlation between residual elements in the set of residual elements 208. Less data may be used to transmit the set of correlation elements 210 than the set of residual elements 208, particularly where there is strong correlation in the set of residual elements 208. The set of correlation elements 210 may exploit directional correlation. The set of correlation elements 210 may exploit average, horizontal, vertical and/or diagonal correlation. In some examples, the set of correlation elements 210 includes at least one value derived based on an average of at least some of the values in the set of residual elements 208 and an average of at least some values in the downsampled data 204. Such a derived value may correspond to a predicted average value or a delta average value, $\Delta_A$, which is described in international patent application no. PCT/EP2013/059847.

In this example, the set of correlation elements 210 is transformed into a transformed set of correlation elements 212. In this example, the transformed set of correlation elements 212 is derived by performing at least one transformation operation involving some or all of the correlation elements in the set of correlation elements 210. The transformed set of correlation elements 212 may be derived by pre-multiplying the set of correlation elements 210 with a second transformation matrix (or 'kernel'), $K_2$ This may be written as $\beta=K_2 \cdot \alpha$, where $\beta$ represents the transformed set of correlation elements 212 and a represents the set of correlation elements 210.

Instead of deriving the transformed set of correlation elements 212 by pre-multiplying the entire set of correlation elements 210 with a single second transformation matrix, smaller groups of correlation elements in the set of correlation elements 210 could be pre-multiplied by respective smaller second transformation matrices.

In this example, the transformed set of correlation elements 212 is arranged as a 4×4 array of correlation elements comprising four rows and four columns of signal elements. In this example, the transformed set of correlation elements 212 comprises four groups of correlation elements. Each of the groups of correlation elements comprises a plurality of correlation elements. In this example, each group of correlation elements is a 2×2 array of correlation elements. A correlation element $\beta_{ij}$ corresponds to the $j^{th}$ correlation element in the $i^{th}$ group of correlation elements in the set of correlation elements 212.

The transformed set of correlation elements 212 may facilitate more efficient encoding compared to the set of correlation elements 210 by providing a larger number of different types of correlation element whose associated encoding parameters may be set individually.

As such, the least one transformation operation may be performed by performing a transformation (or 'transform') involving the first plurality of residual elements, for example $R_{11}$, $R_{12}$, $R_{13}$, $R_{14}$, to generate a first set of correlation elements, for example consisting of $\alpha_{11}$, $\beta_{12}$, $\alpha_{13}$, $\alpha_{14}$. Performing the least one transformation operation may also involve performing a transformation involving the second plurality of residual elements, for example $R_{21}$, $R_{22}$, $R_{23}$, $R_{24}$ to generate a second set of correlation elements, for example consisting of $\alpha_{21}$, $\alpha_{22}$, $\alpha_{23}$, $\alpha_{24}$. At least one correlation element in the first set of correlation elements, for example $\alpha_{11}$, $\alpha_{12}$, $\alpha_{13}$, $\alpha_{14}$, is dependent on an extent of correlation between at least some of the first plurality of residual elements, $R_{11}$, $R_{12}$, $R_{13}$, $R_{14}$. Each of the correlation elements in the first set of correlation elements, for example $\alpha_{11}$, $\alpha_{12}$, $\alpha_{13}$, $\alpha_{14}$, may be dependent on an extent of correlation between each of the first plurality of residual elements, $R_{11}$, $R_{12}$, $R_{13}$, $R_{14}$. At least one correlation element in the second set of correlation elements, for example $\alpha_{21}$, $\alpha_{22}$, $\alpha_{23}$, $\alpha_{24}$, is dependent on an extent of correlation between at least some of the second plurality of residual elements, for example $R_{11}$, $R_{22}$, $R_{23}$, $R_{24}$. Each of the correlation elements in the second set of correlation elements, for example $\alpha_{21}$, $\alpha_{22}$, $\alpha_{23}$, $\alpha_{24}$, may be dependent on an extent of correlation between each of the second plurality of residual elements, for example $R_{21}$, $R_{22}$, $R_{23}$, $R_{24}$. As such, in a first stage, residual elements are transformed into one or more intermediate sets of correlation elements, for example the set of correlation elements 210. Related correlation elements may be grouped together. For example, correlation elements may be grouped based on the residual elements with which they are associated or based on correlation element type.

The at least one transformation operation may be performed by performing a transformation involving at least one correlation element in a first subset of correlation elements in the set of correlation elements 210, for example an, $\alpha_{11}$, $\alpha_{12}$, $\alpha_{13}$, $\alpha_{14}$, and at least one correlation element in a second subset of correlation elements in the set of correlation elements 210, for example $\alpha_{21}$, $\alpha_{22}$, $\alpha_{23}$, $\alpha_{24}$, to generate at least one correlation element in a third set of correlation elements, for example $\beta_{11}$ in the transformed set of correlation elements 212. For example, correlation elements $\alpha_{11}$ and $\alpha_{21}$ may be involved in a transformation operation to generate correlation element $\beta_{11}$. One of more further correlation elements, such as $\alpha_{31}$ and $\alpha_{41}$, may also be involved in a transformation operation to generate correlation element $\beta_{11}$. The at least one correlation element, for example $\beta_{11}$, in the third set of correlation elements, is dependent on an extent of correlation between the at least one correlation element, for example $\alpha_{11}$, in the first set of correlation elements and the at least one correlation element, for example $\alpha_{21}$, in the second set of correlation elements. As such, in a second stage, correlation elements in one or more intermediate sets of correlation elements, for example the set of correlation elements 210, are involved in a transformation operation into one or more final sets of correlation elements, for example the transformed set of correlation elements 212. The correlation elements in the one or more final sets of correlation elements may exploit two levels of correlation, namely one between residual elements in the set of residual elements 208 and another between correlation elements in the set of correlation elements 210. This may lead to more efficient encoding where there is strong correlation at both levels and also allowing a fine-grained configuration of encoder settings.

The at least one transformation operation may be performed by performing a different transformation involving the at least one correlation element, for example $\alpha_{11}$, in the first set of correlation elements and the at least one correlation element, for example $\alpha_{21}$, in the second set of correlation elements to generate at least one other correlation element in the third set of correlation elements, for example $\beta_{21}$. For example, correlation elements $\alpha_{11}$ and $\alpha_{21}$ may be involved in a transformation operation using another type of transformation to generate correlation element $\beta_{21}$. One or more further correlation elements, such as $\alpha 31$ and $\alpha_{41}$, may also be used to generate correlation element $\beta_{21}$. The at least one other correlation element, for example $\beta_{21}$, in the third set of correlation elements is dependent on an extent of correlation between the at least one correlation element, for example $\alpha_{11}$, in the first set of correlation elements and the at least one correlation element, for example $\alpha_{21}$, in the second set of correlation elements. Multiple different types of correlation may be exploited by performing different transformations involving the intermediate correlation elements $\alpha_{ij}$. This may facilitate efficient encoding where multiple different types of correlation show strong correlation characteristics.

In this example, deriving the transformed set of correlation elements 212 may comprise performing one or more transformation operations involving at least one residual element, for example $R_{11}$, in the first plurality of residual elements, $R_{11}$, $R_{12}$, $R_{13}$, $R_{14}$, and at least one residual element, for example $R_{21}$, in the second plurality of residual elements, $R_{21}$, $R_{22}$, $R_{23}$, $R_{24}$. A residual element, for example $R_{11}$, in the first plurality of residual elements, $R_{11}$, $R_{12}$, $R_{13}$, $R_{14}$, may be used to generate a first correlation element, for example an, in the set of correlation elements 210 and a residual element, for example $R_{21}$, in the second plurality of residual elements may be used to generate a second correlation element, for example $\alpha_{21}$, in the set of correlation elements 210. The first and second correlation elements, for example $\alpha_{11}$, and $\alpha_{21}$, in the set of correlation elements 210 may be used to generate at least one correlation element, for example $\beta_{11}$, in the transformed set of correlation elements 212.

In contrast to the correlation elements in the transformed set of correlation elements 212, in this example the correlation elements in the set of correlation elements 210 are not generated by performing one or more transformation operations involving at least one residual in the first plurality of residual elements, $R_{11}$, $R_{12}$, $R_{13}$, $R_{14}$, and at least one residual element in the second plurality of residual elements, $R_{21}$, $R_{22}$, $R_{23}$, $R_{24}$. Instead, in this example, each of the correlation elements in the set of correlation elements 210 is generated by performing one or more transformation operations involving at least one residual from a single plurality of residual elements only, for example involving only residual elements in the first plurality of residual elements, $R_{11}$, $R_{12}$, $R_{13}$, $R_{14}$.

In this example, the at least one transformation operation generates at least one correlation element, for example correlation element $\beta_{11}$ in the transformed set of correlation elements 212. The at least one correlation element is dependent on an extent of correlation between the at least one residual element in the first plurality of residual elements and the at least one residual element in the second plurality of residual elements. The value of the at least one correlation element may be inversely proportional to the extent of correlation between the at least one residual element in the first plurality of residual elements and the at least one residual element in the second plurality of residual elements. In other words, the stronger the correlation between the at least one residual element in the first plurality of residual elements and the at least one residual element in the second plurality of residual elements the closer the value of the at least one correlation element is to zero. The extent of correlation may be related to the amount or strength of correlation.

In some examples, each of the correlation elements in the transformed set of correlation elements 212 exploits correlation between each of the residual elements in the set of residual elements 208. As such the at least one transformation operation may involve all of the residual elements in the first plurality of residual elements, $R_{11}$, $R_{12}$, $R_{13}$, $R_{14}$, and all of the residual elements in the second plurality of residual elements, $R_{21}$, $R_{22}$, $R_{23}$, $R_{24}$. Correlation between a relatively large number of residual elements may therefore be exploited. This may lead to efficient encoding where there is a strong correlation between a relatively large number of correlation elements.

A plurality of correlation elements may be generated in performing the at least one transformation operation. By generating multiple correlation elements, different types of correlation may be exploited. As such, more efficient encoding can be obtained where correlation is strong in different directions. Furthermore, different encoder settings may be used for different correlation elements. This facilitates more selective encoding, for example to take account of the importance of the individual correlation elements.

In some examples, the transformed set of correlation elements 212 is used to obtain one or more further transformed sets of correlation elements (not shown). The one or more further transformed sets of correlation elements may be obtained by performing one or more transform operations on the transformed set of correlation elements 212, for example in series. The one or more transform operations may involve one or more directional decomposition operations, as described above. As such, the one or more further transformed sets of correlation elements may be indicative of an extent of correlation, for example a directional or spatial correlation, between different correlation elements in the transformed set of correlation elements 212, or in sets of data elements derived therefrom. This can lead to more efficient encoding, especially when there is a high degree of such correlation.

The first apparatus 102 performs the at least one transformation operation prior to the at least one correlation element being encoded. The first apparatus 102 may encode the at least one correlation element. The at least one correlation element may be encoded by one or more entities other than the first apparatus 102.

The at least one correlation element being encoded may comprise quantisation being performed on the at least one correlation element. Quantisation facilitates reducing the amount of data used to represent the at least one correlation element. The first apparatus 102 may quantise the at least one correlation element. The at least one correlation element may be quantised by one or more entities other than the first apparatus 102.

Individual encoding parameters may be used for encoding individual correlation elements in the transformed set of correlation elements 212. For example, correlation elements that are relatively unimportant (relative to other correlation elements in the transformed set of correlation elements 212) may be subject to a higher level of encoding, for example quantisation, than correlation elements that are relatively important (relative to other correlation elements in the transformed set of correlation elements 212).

In this example, the encoder device 108 obtains a set of encoding parameters. Each of the correlation elements in the plurality of correlation elements may be associated with one or more encoding parameters. This allows for fine-grained specification of encoding parameters, for example to achieve an overall bit rate allowance for the transformed set of correlation elements 212. The individual encoding parameters may also be indicative of the importance of the associated correlation element. This may facilitate efficient encoding by prioritising the most important correlation elements. A correlation element may be associated with multiple encoding parameters. An encoding parameter may be associated with multiple correlation elements.

In some examples, an encoding parameter or other data indicates that an associated correlation element is not to be encoded. For example, the associated correlation element may be discarded and not encoded at all. In some examples, there is a predefined importance threshold level below which a correlation element is not encoded. Instead, a default value for that correlation element may be used. Data may therefore be generated to indicate that at least some of the plurality of correlation elements are not to be encoded. Encoding may be made more efficient by not encoding some of the plurality of correlation elements. Encoding may be more efficient as less data is encoded.

The encoding parameter for each of the correlation elements in the plurality of correlation elements may be determined. Determining the encoding parameters may involve looking up some or all of the encoding parameters, calculating the some or all of the encoding parameters or obtaining some or all of the encoding parameters in another way.

In some examples, the value of an encoding parameter is determined based at least in part on the importance of the correlation element with which it is associated, relative to the importance other correlation elements in the transformed set of correlation elements 212. The value of the encoding parameter may be indicative of the importance of the associated correlation element in terms of perceived quality.

In some examples, at least some of the correlation elements in the transformed set of correlation elements 212 are associated with the same encoding parameter and/or encoding parameter value as each other. This may indicate that those correlation elements are all equally important in terms of perceived quality. Encoding may be enhanced by designating the same level of encoding for different ones of the correlation elements, for example where any differences in importance of associated correlation elements to not exceed a threshold level, so the encoder can use the same encoder settings for multiple ones of the correlation elements. The threshold level may be zero or non-zero.

In some examples, at least some of the correlation elements in the transformed set of correlation elements 212 are associated with different encoding parameters and/or encoding parameter values. This may facilitate encoding by determining the relative importance of those correlation elements in terms of perceived quality. For example, different amounts of quantisation may be used dependent upon the relative importance of those correlation elements in terms of perceived quality.

In some examples, all of the correlation elements in the transformed set of correlation elements are associated with different encoding parameters and/or encoding parameter values.

Various different factors may be taken into account in determining the values of the encoding parameters in the set of encoding parameters. Examples of such factors include, but are not limited to, frequency analysis, angular frequency analysis, viewing distance analysis and pixel size analysis. Taking such factors into account may facilitate ranking of the correlation elements in terms of perceptual importance. This, in turn, may be used to determine the extent to which, for example, quantisation should be applied to the correlation elements.

At least some of the encoding parameters may be representative of respective measures of perceptual importance amongst the correlation elements. This may enhance encoding by allowing encoding to be weighted based on a measure of importance of the correlation elements.

At least some of the encoding parameters may be the same for different ones of the correlation elements in the plurality of correlation elements.

The plurality of encoding parameters may comprise at least one quantisation coefficient. As such, different levels of quantisation may be applied to different correlation elements, for example based on their importance. This may provide encoding techniques in which reducing an amount of data to be transmitted is balanced against the perception of quality associated with quantised data.

In some examples, the first apparatus 102 outputs the set of encoding parameters to at least one further apparatus, for example the second apparatus 104. The second apparatus 104 may use the set of encoding parameters to facilitate decoding of the encoded correlation elements. As such, data comprising the encoding parameters may be output. This also facilitates encoding where encoding is performed by another entity.

The plurality of correlation elements may be encoded based on the set of encoding parameters. As such, a reliable mechanism is provided for encoding the plurality of correlation elements, for example to reflect their relative importance.

In this example, the first apparatus 102 performs the at least one transformation operation, to generate the at least one correlation element in the transformed set of correlation elements, prior to the at least one correlation element being encoded.

In this example, the first apparatus 102 transmits the downsampled data 204 and the transformed set of correlation elements 212 to the second apparatus 104, possibly in an encoded form.

Figure 3:
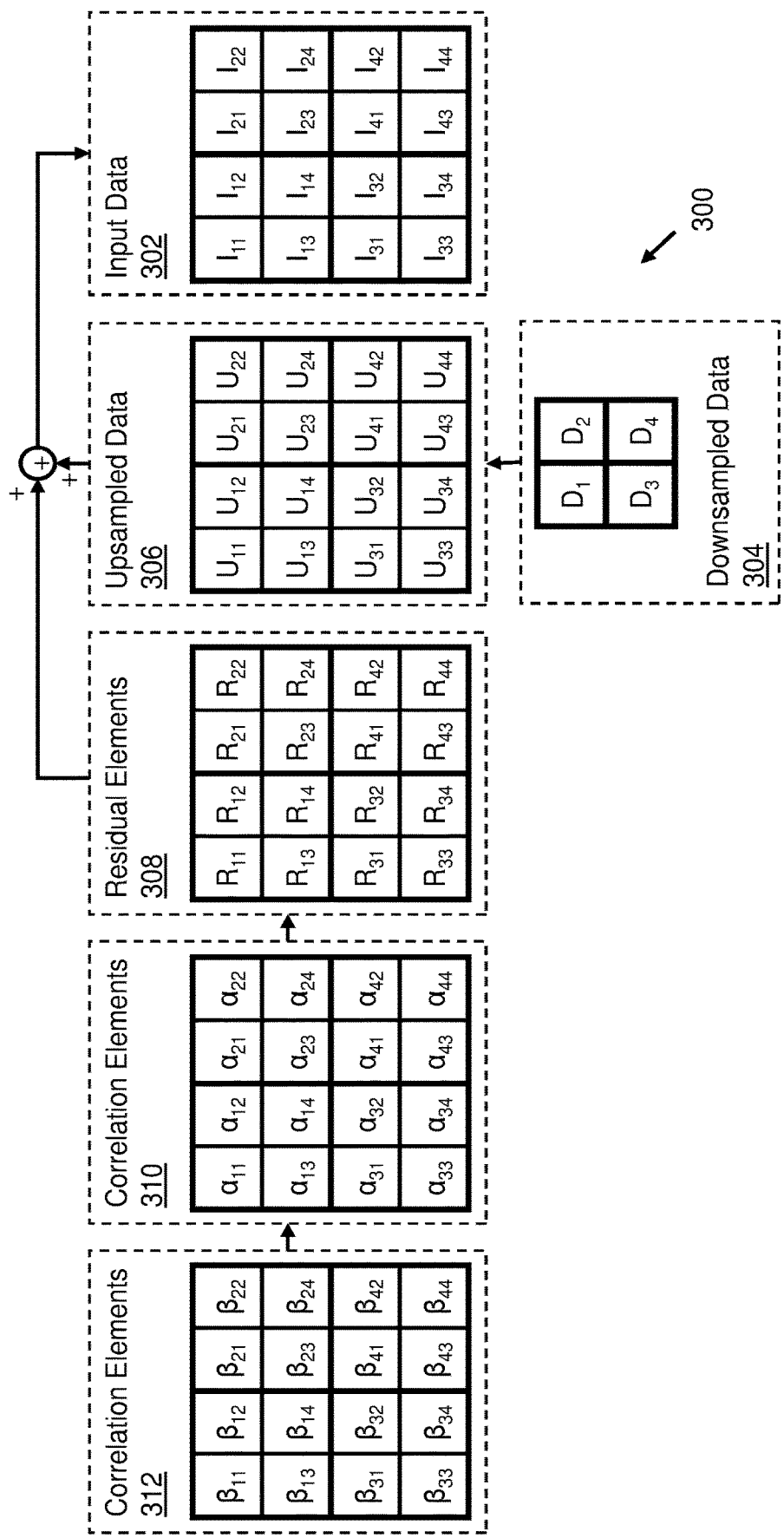
FIG. 3 shows a schematic diagram of another example of a signal processing technique in accordance with an embodiment of the present invention.

Referring to FIG. 3, there is shown schematically an example of a signal processing technique 30). The signal processing technique 30) may be performed by the second apparatus 104. Some items depicted in FIG. 3 are similar to items shown in FIG. 2. Corresponding reference signs, incremented by 100, have therefore been used for similar items.

In this example, the second apparatus 104 receives downsampled data 304 and the transformed set of correlation elements 312 from the first apparatus 102. In other examples, the second apparatus 104 receives data usable to obtain the downsampled data 304 and/or the transformed set of correlation elements 312, rather than the downsampled data 304 and/or the transformed set of correlation elements 312 itself. For example, the second apparatus 104 may derive the downsampled data 304 and/or the transformed set of correlation elements 312 based on the received data.

Pre-multiplying both sides of the above equation $\beta = K_2 \cdot \alpha$ by the inverse of $K_2$, namely $K_2^{-1}$, gives $K_2^{-1} \cdot \beta = K_2^{-1} \cdot K_2 \cdot \alpha$. Since pre-multiplying a matrix by its inverse gives the identity matrix, $K_2^{-1} \cdot \beta = \alpha$. As such, the second apparatus 104 can derive the set of correlation elements 310 by pre-multiplying the transformed set of correlation elements 312 with the inverse of the second transformation matrix, $K_2^{-1}$. Pre-multiplying both sides of the above equation $\alpha = K_1 \cdot R$ by the inverse of $K_1$, namely $K_1^{-1}$, gives $K_1 \cdot \alpha = K_1^{-1} \cdot K_1 \cdot R$. Since pre-multiplying a matrix by its inverse gives the identity matrix, $K_1^{-1} \cdot \alpha = R$. As such, the second apparatus 104 can derive the set of residual elements 308 by pre-multiplying the set of correlation elements 310 with the inverse of the first transformation matrix, $K_1^{-1}$.

As such, the second apparatus 104 recovers the set of residual elements 308.

The downsampled data 304 is processed to generate data 306. In this example, the data 306 is obtained by upsampling the downsampled data 304 in the same manner as the first apparatus 102 upsampled the data 204. In this specific example, the data 306 is referred to as "upsampled data", it being understood that the data could be processed in a different way in other examples.

The second apparatus 104 can therefore recover the input data 302 using the upsampled data 306 and the set of residual elements 308 since all of the values $U_{ij}$ and $R_{ij}$ are known to the second apparatus 104.

The second apparatus 104 performs at least one transformation operation involving at least one correlation element, for example $\beta_{11}$ in the transformed set of correlation elements 312. The at least one transformation operation may involve at least one transformation that is the inverse of a transformation performed by the first apparatus 102. The at least one transformation operation generates at least one residual element, for example $R_{11}$, in a first plurality of residual elements, for example $R_{11}$, $R_{12}$, $R_{13}$, $R_{14}$, and at least one residual element, for example $R_{21}$, in a second plurality of residual elements, for example $R_{21}$, $R_{22}$, $R_{23}$, $R_{24}$. The at least one transformation operation may generate one or more further residual elements. The at least one transformation operation may involve one or more additional correlation elements.

The at least one correlation element, for example $\beta_{11}$, is dependent on an extent of correlation between the at least one residual element, for example $R_{11}$, in the first plurality of residual elements and the at least one residual element, for example $R_{21}$, in the second plurality of residual elements. The first plurality of residual elements, for example $R_{11}$, $R_{12}$, $R_{13}$, $R_{14}$, is useable to reconstruct a first part of a first representation of a signal at a relatively high level of quality, for example the part of the input data 302 consisting of signal elements $I_{11}$, $I_{12}$, $I_{13}$, $I_{14}$, using a first part of a second representation of the signal at the relatively high level of quality, for example the pan of the upsampled data 306 consisting of signal elements $U_{11}$, $U_{12}$, $U_{13}$, $U_{14}$. The second plurality of residual elements, for example $R_{21}$, $R_{22}$, $R_{23}$, $R_{24}$, is useable to reconstruct a second, different part of the first representation of the signal, for example the part of the input data 302 consisting of signal elements $I_{21}$, $I_{22}$, $I_{23}$, $I_{24}$, using a second, different part of the second representation of the signal, for example the part of the upsampled data 306 consisting of signal elements $U_{21}$, $U_{22}$, $U_{23}$, $U_{24}$.

The second apparatus 104 derives the first part of the second representation, for example the part of the upsampled data 306 consisting of signal elements $U_{11}$, $U_{12}$, $U_{13}$, $U_{14}$, from a first set of one or more signal elements in a representation of the signal at a relatively low level of quality, for example signal element $D_1$ in the downsampled data 304.

The second apparatus 104 derives the second, different part of the second representation, for example the part of the upsampled data 306 consisting of signal elements $U_{21}$, $U_{22}$, $U_{23}$, $U_{24}$, from a second, different set of one or more signal elements in a representation of the signal at a relatively low level of quality, for example signal element $D_2$ in the downsampled data 304.

The second apparatus 104 uses at least the first plurality of residual elements, for example $R_{11}$, $R_{12}$, $R_{13}$, $R_{14}$, the second plurality of residual elements, for example $R_{21}$, $R_{22}$, $R_{23}$, $R_{24}$, the first part of the second representation, for example $U_{11}$, $U_{12}$, $U_{13}$, $U_{14}$, and the second part of the second representation, for example $U_{21}$, $U_{22}$, $U_{23}$, $U_{24}$, to generate output data. The output data may comprise input data 302.

The second apparatus 104 is configured to perform the at least one transformation operation following the at least one correlation element, for example Pu, having been decoded. The at least one correlation element may be decoded by the second apparatus 104 or by one or more other entities.

The second apparatus 104 may have at least some other features described herein, for example features described in relation to the first apparatus 102. The second apparatus 104 may be configured to perform at least some other techniques described herein, for example techniques described herein in relation to the first apparatus 102.

Figure 4:
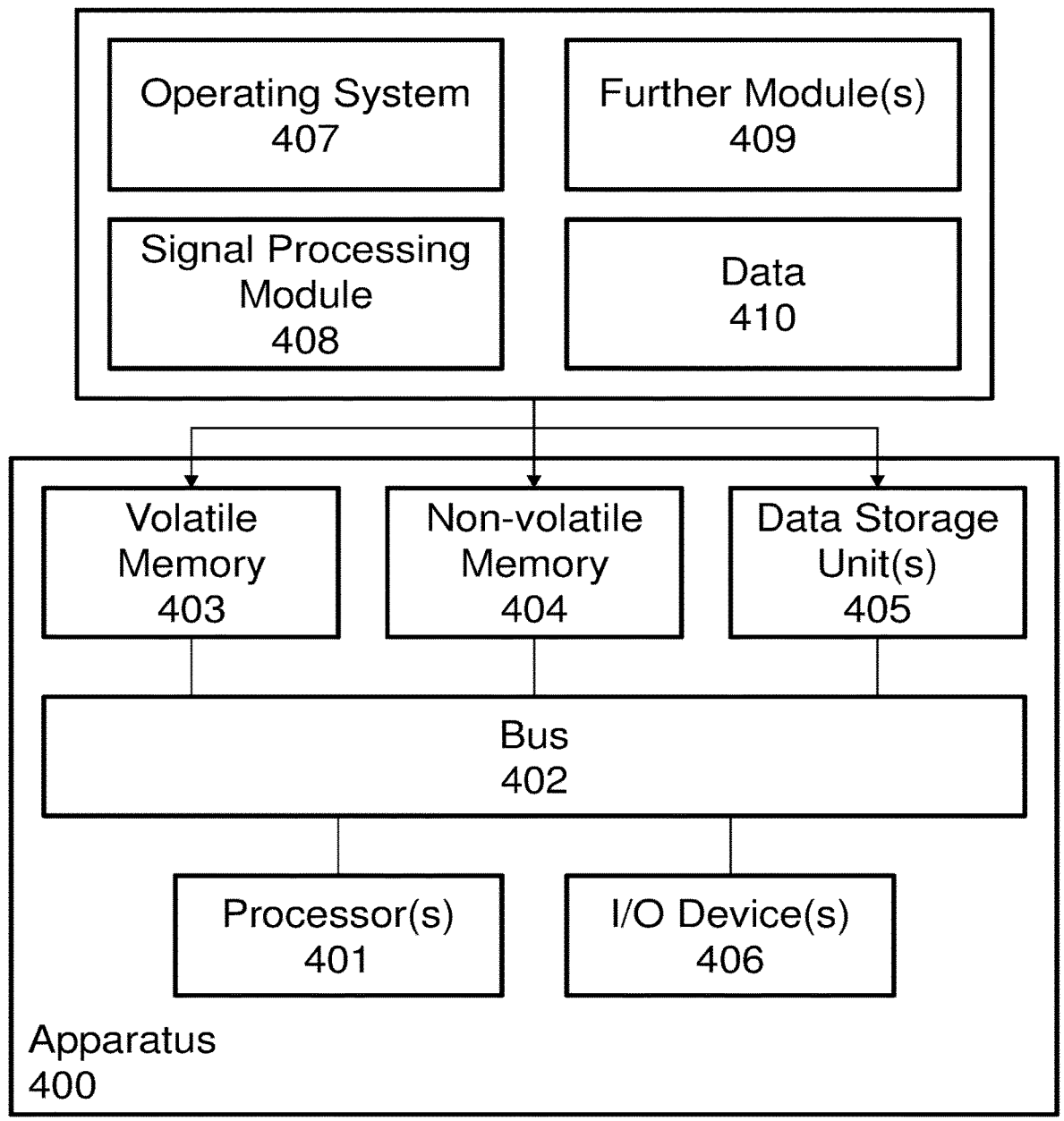
FIG. 4 shows a schematic block diagram of an example of an apparatus in accordance with an embodiment of the present invention.

Referring to FIG. 4, there is shown a schematic block diagram of an example of an apparatus 400.

In an example, the apparatus 400 comprises a decoder device. In another example, the apparatus 400 comprises an encoder device.

Other examples of apparatus 400 include, but are not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, mobile device, video game console, handheld video game device, a peripheral device such as a switch, modem, router, etc., or in general any type of computing or electronic device.

In this example, the apparatus 400 comprises one or more processors 401 configured to process information and/or instructions. The one or more processors 401 may comprise a central processing unit (CPU). The one or more processors 401 are coupled with a bus 402. Operations performed by the one or more processors 401 may be carried out by hardware and/or software. The one or more processors 401 may comprise multiple co-located processors or multiple disparately located processors.

In this example, the apparatus 400 comprises computer-useable volatile memory 403 configured to store information and/or instructions for the one or more processors 401. The computer-useable volatile memory 403 is coupled with the bus 402. The computer-useable volatile memory 403 may comprise random access memory (RAM).

In this example, the apparatus 400 comprises computer-useable non-volatile memory 404 configured to store information and/or instructions for the one or more processors 401. The computer-useable non-volatile memory 404 is coupled with the bus 402. The computer-useable non-volatile memory 404 may comprise read-only memory (ROM).

In this example, the apparatus 400 comprises one or more data-storage units 405 configured to store information and/or instructions. The one or more data-storage units 405 are coupled with the bus 402. The one or more data-storage units 405 may for example comprise a magnetic or optical disk and disk drive or a solid-state drive (SSD).

In this example, the apparatus 400 comprises one or more input/output (I/O) devices 406 configured to communicate information to and/or from the one or more processors 401. The one or more I/O devices 406 are coupled with the bus 402. The one or more I/O devices 406 may comprise at least one network interface. The at least one network interface may enable the apparatus 400 to communicate via one or more data communications networks. Examples of data communications networks include, but are not limited to, the Internet and a Local Area Network (LAN). The one or more I/O devices 406 may enable a user to provide input to the apparatus 400 via one or more input devices (not shown). The one or more input devices may include for example a remote control, one or more physical buttons etc. The one or more I/O devices 406 may enable information to be provided to a user via one or more output devices (not shown). The one or more output devices may for example include a display screen.

Various other entities are depicted for the apparatus 400. For example, when present, an operating system 407, signal processing module 408, one or more further modules 409, and data 410 are shown as residing in one, or a combination, of the computer-usable volatile memory 403, computer-usable non-volatile memory 404 and the one or more data-storage units 405. The signal processing module 408 may be implemented by way of computer program code stored in memory locations within the computer-usable non-volatile memory 404, computer-readable storage media within the one or more data-storage units 405 and/or other tangible computer-readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips or as an Application Specific Integrated Circuit (ASIC).

The apparatus 400 may therefore comprise a signal processing module 408 which can be executed by the one or more processors 401. The signal processing module 408 can be configured to include instructions to implement at least some of the operations described herein. During operation, the one or more processors 401 launch, run, execute, interpret or otherwise perform the instructions in the signal processing module 408.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program.

It will be appreciated that the apparatus 400 may comprise more, fewer and/or different components from those depicted in FIG. 4.

The apparatus 400 may be located in a single location or may be distributed in multiple locations. Such locations may be local or remote.

The techniques described herein may be implemented in software or hardware, or may be implemented using a combination of software and hardware. They may include configuring an apparatus to carry out and/or support any or all of techniques described herein.

Various measures (for example apparatuses, methods, computer programs and computer-readable media) are provided in which a first plurality of residual elements is obtained. The first plurality of residual elements is useable to reconstruct a first part of a first representation of a signal at a relatively high level of quality using a first part of a second representation of the signal at the relatively high level of quality. The first part of the second representation is derivable from a first set of one or more signal elements in a representation of the signal at a relatively low level of quality. A second plurality of residual elements is obtained. The second plurality of residuals is useable to reconstruct a second, different part of the first representation of the signal using a second, different part of the second representation of the signal. The second part of the second representation is derivable from a second, different set of one or more signal elements in the representation of the signal at the relatively low level of quality. At least one transformation operation involving at least one residual element in the first plurality of residual elements and at least one residual element in the second plurality of residual elements is performed to generate at least one correlation element. The at least one correlation element is dependent on an extent of correlation between the at least one residual element in the first plurality of residual elements and the at least one residual element in the second plurality of residual elements. The apparatus is configured to perform the at least one transformation operation prior to the at least one correlation element being encoded.

In examples described above, the at least one transformation operation comprises at least one directional decomposition operation.

In examples described above, the at least one transformation operation comprises at least one mathematical operation.

In examples described above, the at least one transformation operation comprises at least one linear combination operation.

In examples described above, the at least one transformation operation comprises at least one linear combination operation.

In examples described above, a plurality of correlation elements is generated in performing the at least one transformation operation.

In examples described above, data is generated to indicate that at least some of the plurality of correlation elements are not to be encoded.

In examples described above, each of the correlation elements in the plurality of correlation elements is associated with an encoding parameter.

In examples described above, the encoding parameter for each of the correlation elements in the plurality of correlation elements is determined.

In examples described above, the encoding parameter for each of the correlation elements in the plurality of correlation elements is determined based on a position of the correlation elements in the plurality of correlation elements.

In examples described above, a value of an encoding parameter in the plurality of correlation elements is independent of a value of a correlation element associated with the encoding parameter.

In examples described above, at least some of the encoding parameters are different for different ones of the correlation elements in the plurality of correlation elements.

In examples described above, at least some of the encoding parameters are the same for different ones of the correlation elements in the plurality of correlation elements.

In examples described above, at least some of the encoding parameters are representative of respective measures of perceptual importance amongst the correlation elements.

In examples described above, the plurality of encoding parameters comprises at least one quantisation coefficient.

In examples described above, the plurality of correlation elements is encoded based on the encoding parameters.

In examples described above, data comprising the encoding parameters is output.

In examples described above, the at least one correlation element being encoded comprises quantisation being performed on the at least one correlation element.

In examples described above, at least one transformation operation is performed by performing a transformation involving the first plurality of residual elements to generate a first set of correlation elements and performing a transformation involving the second plurality of residual elements to generate a second set of correlation elements. At least one correlation element in the first set of correlation elements is dependent on an extent of correlation between at least some of the first plurality of residual elements. At least one correlation element in the second set of correlation elements is dependent on an extent of correlation between at least some of the second plurality of residual elements.

In examples described above, different correlation elements in the first and second sets of correlation elements represent different types of correlation. Correlation elements of the same type are grouped together within the first and second sets of correlation elements.

In examples described above, the at least one transformation operation is performed by performing a transformation involving at least one correlation element in the first set of correlation elements and at least one correlation element in the second set of correlation elements to generate at least one correlation element in a third set of correlation elements. The at least one correlation element in the third set of correlation elements is dependent on an extent of correlation between the at least one correlation element in the first set of correlation elements and the at least one correlation element in the second set of correlation elements.

In examples described above, the at least one transformation operation is performed by performing a different transformation involving the at least one correlation element in the first set of correlation elements and the at least one correlation element in the second set of correlation elements to generate at least one other correlation element in the third set of correlation elements. The at least one other correlation element in the third set of correlation elements is dependent on an extent of correlation between the at least one correlation element in the first set of correlation elements and the at least one correlation element in the second set of correlation elements.

In examples described above, at least one transformation operation involves all of the residual elements in the first plurality of residual elements and all of the residual elements in the second plurality of residual elements.

Various measures (for example apparatuses, methods, computer programs and computer-readable media) are provided in which at least one transformation operation involving at least one correlation element is performed to generate at least one residual element in a first plurality of residual elements and at least one residual element in a second plurality of residual elements. The at least one correlation element is dependent on an extent of correlation between the at least one residual element in the first plurality of residual elements and the at least one residual element in the second plurality of residual elements. The first plurality of residual elements is useable to reconstruct a first part of a first representation of a signal at a relatively high level of quality using a first part of a second representation of the signal at the relatively high level of quality. The second plurality of residual elements is useable to reconstruct a second, different part of the first representation of the signal using a second, different part of the second representation of the signal. The first part of the second representation is derived from a first set of one or more signal elements in a representation of the signal at a relatively low level of quality. The second part of the second representation is derived from a second, different set of one or more signal elements in the representation of the signal at the relatively low level of quality. At least the first plurality of residual elements, the second plurality of residual elements, the first part of the second representation and the second part of the second representation are used to generate output data. The at least one transformation operation is performed following the at least one correlation element being decoded.

Various measures (for example apparatuses, methods, computer programs and computer-readable media) are provided to process signal data. A set of residual elements is obtained. A first plurality of residual elements in the set of residual elements is useable to generate a first set of correlation elements. A second plurality of residual elements in the set of residual elements is useable to generate a second set of correlation elements. At least one correlation element in the first set of correlation elements is indicative of an extent of correlation, for example spatial or directional correlation, between at least some of the first plurality of residual elements. At least one correlation element in the second set of correlation elements is indicative of an extent of correlation, for example spatial or directional correlation, between at least some of the second plurality of residual elements. The first and second sets of correlation elements are transformable into a third set of correlation elements. At least one correlation element in the third set of correlation elements is indicative of an extent of correlation, for example spatial or directional correlation, between one or more of the at least one correlation elements in the first set of correlation elements and one or more of the at least one correlation elements in the second set of correlation elements. A first correlation element in the third set of correlation elements is generated by performing a first transformation operation involving at least one of the first plurality of residual elements and at least one of the second plurality of residual elements. A second correlation element in the third set of correlation elements is generated by performing a second transformation operation on the at least one of the first plurality of residual elements and on the at least one of the second plurality of residual elements.

The above embodiments are to be understood as illustrative examples. Further embodiments are envisaged.

In examples described above, the second apparatus 104 is able to recover or reconstruct fully the input data obtained by the first apparatus 102. In other examples, the second apparatus 104 may not be able to recover fully the input data obtained by the first apparatus 102. For example, some information that may be needed to recover the original input data may be lost during quantisation and may not be recoverable by the second apparatus 104.

In examples described above, the transformed set of correlation elements 212 is obtained indirectly from the set of residual elements 208 by two separate matrix multiplications involving the first and second transformation matrices $K_1$ and $K_2$. In other examples, the transformed set of correlation elements 212 is obtained directly from the set of residual elements 208 by combining the two matrix multiplications involving the first and second transformation matrices $K_1$ and $K_2$ described above. In such other examples, rather than carrying out two separate matrix multiplications, one involving $K_1$ and the other involving $K_2$, a single matrix multiplication operation merging both matrix transformations is used. Pre-multiplying both sides of the above equation $\alpha=K_1 \cdot R$ by $K_2$ gives $K_2 \cdot \alpha = K_2 \cdot K_1 \cdot R$. Using the above equation, $\beta=K_2 \cdot \alpha$, it can be seen that $\beta = K_2 \cdot \alpha = K_2 \cdot K_1 \cdot R$. A merged matrix, $K_3$, may be obtained by $K_3 = K_2 \cdot K_1$ and the transform performed as $\beta = K_3 \cdot R$. Merging two matrix multiplications may be beneficial in that memory is not used to store an intermediate matrix. Processing time may also be reduced in performing one matrix multiplication compared to performing two matrix multiplications.

In examples described above, a set of correlation elements is obtained by pre-multiplying a set of residual elements with a first transformation matrix, $K_1$, and a transformed set of correlation elements is obtained by pre-multiplying the set of correlation elements with a second transformation matrix, $K_2$. The set of correlation elements and the transformed set of correlation elements are derived from residual elements corresponding to a 4×4 array of signal elements. As such, each of $K_1$ and $K_2$ may comprise a 16×16 transformation matrix which is applied to a 16×1 set of data elements. In some examples, smaller groups of residual elements and/or correlation elements are pre-multiplied by respective smaller transformation matrices. For example, one or both of $K_1$ and $K_2$ may comprise a 4×4 transformation matrix and may be applied to a 4×1 set of data elements.

In one example, the first transformation matrix, $K_1$, comprises the following matrix:

$$K_i = \frac{1}{4}\begin{bmatrix} 2 & 2 & 0 & 0 \\ 1 & -1 & 1 & -1 \\ 0 & 0 & 2 & 2 \\ 1 & -1 & -1 & 1 \end{bmatrix}.$$

Applying $K_1$ to four 4×1 sets of residual elements, each set corresponding to a 2×2 array of signal elements, results in four 4×1 sets of correlation elements. At least one of the correlation elements in each set is derived from at least two residual elements associated with signal elements from one row of signal elements and a different number of residual elements associated with signal elements from another row of signal elements. For example, a correlation element resulting from the first row of $K_1$ is derived from two residual elements associated with signal elements from one row of signal elements and no residual elements associated with signal elements from another row of signal elements. A correlation element resulting from the second row of $K_1$, on the other hand, is derived from two residual elements associated with signal elements from one row of signal elements and two residual elements associated with signal elements from another row of signal elements. $K_1$ may be referred to as a "1D" correlation transformation matrix in this example, in that it emphasises horizontal correlation over vertical correlation.

As such, in this example, at least one correlation element in each set of correlation elements is not derived from contributions of equal numbers of residual elements associated with signal elements from the first and second rows of signal elements of the input data. By taking uneven contributions in this way, the contributions of residual elements associated with signal elements from different rows of signal elements of the input data in deriving the correlation elements can be more readily weighted. In effect, the rows of signal elements of the input data may be decoupled in terms of their relative contributions to the set of correlation elements. The elements in the transformation matrix, $K_1$, may be selected to influence the relative contributions of residual elements associated with signal elements from different rows of signal elements in deriving the set of correlation elements. Decoupling the rows of signal elements of the input data in terms of their respective contributions to the set of correlation elements provides various effects. Allowing different rows of input signal elements to have different weighted contributions may, for example, provide an improved performance when handling interlaced video signals. In interlaced video, a given video frame, for example comprising 1920×1080 data elements, is an arrangement of two fields of video data, each comprising 1920×540 data elements, whose rows of data elements are interlaced with each other. Each of the two fields is representative of the video at different time samples. Accordingly, vertical correlation between adjacent signal elements in a frame of interlaced video signal, that is, correlation between data elements of adjacent rows, is reduced, and may even be absent or artificial. Horizontal correlation between adjacent data elements, that is, correlation between data elements of adjacent columns, is more significant than vertical correlation. Therefore, the ability to influence the contributions of data elements from different rows so that, for example, only data elements from a single field are used, may be beneficial in ensuring that any false or unwanted vertical correlation is not taken into account. Additionally, downsampling and upsampling interlaced video signals in two-dimensions may introduce further considerations, owing to the two interlaced fields corresponding to two different points in time. The fields may be de-interlaced prior to downsampling, but this may be computationally expensive and may produce unwanted image artefacts or discontinuities. Therefore, the interlaced video may be downsampled and upsampled in the horizontal dimension only. An example resolution of a field of interlaced video is 1920×540. A horizontally downsampled rendition of the field of interlaced video may have a resolution of 960×540, for example. In such a horizontal downsampling operation, or a corresponding horizontal upsampling operation, no contributions from vertically adjacent data elements are taken into account.

Furthermore, taking unequal contributions from different rows of signal elements may also be beneficial in the case of progressive video. In progressive video, cameras may scan images horizontally and may therefore have an effectively one-dimensional transfer function. Therefore, any vertical correlation may be false and it may be desirable to reduce the influence of such artificial vertical correlation.

Each of the four 4×1 sets of correlation elements may be pre-multiplied by a second 4×4 transformation matrix, $K_2$, to obtain four sets of four transformed correlation elements. In an example, the second transformation matrix, $K_2$ Comprises the following matrix:

$$K_i = \frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}.$$

The second transformation matrix, $K_2$, may be referred to as a "2D" correlation transformation matrix in this example, in that it treats horizontal and vertical correlation equally. For example, each transformed correlation element in a set of transformed correlation elements may take equal contributions from every correlation element in a corresponding set of correlation elements.

The first transformation matrix, $K_1$, and/or the second transformation matrix, $K_2$, may be different from those shown above. In some examples, the first transformation matrix, $K_1$, is the same as the second transformation matrix, $K_2$. In some examples, the first transformation matrix, $K_1$, is a "2D" correlation transformation matrix as described above. In some examples, the second transformation matrix, $K_2$, is a "1D" correlation transformation matrix as described above.

In some examples, instead of $K_1$ and $K_2$ each being applied to four sets of four elements, a set of sixteen correlation elements is derived by applying a first 16×16 transformation matrix to a set of residual elements corresponding to a 4×4 array of signal elements, and a set of sixteen transformed correlation elements is then derived by applying a second 16×16 transformation matrix to the set of sixteen correlation elements. The first 16×16 transformation matrix may relate to a 1D correlation transformation and the second 16×16 transformation matrix may relate to a 2D correlation transformation.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. An apparatus comprising:
at least one processor; and
non-transitory system memory having stored thereon computer-executable instructions which, when executed by the at least one processor, cause the apparatus to perform the following:
obtain a first plurality of signal elements relating to a first part of a representation of a signal at a first level of quality, the first part of the first representation of the signal being derivable from signal elements from a representation of the signal at a second level of quality, the second level of quality being lower than the first level of quality;
obtain a second plurality of signal elements relating to a second, different part of the representation of the signal at the first level of quality, the second part of the representation being derivable from a different set of signal elements in the representation of the signal at the second level of quality; and
perform at least one transformation operation involving at least one signal element in the first plurality of signal elements and at least one signal element in the second plurality of signal elements to generate at least one correlation element, the at least one correlation element being dependent on an extent of correlation between the at least one signal element in the first plurality of signal elements and the at least one signal element in the second plurality of signal elements,
wherein the at least one transformation operation comprises at least one matrix multiplication operation involving at least a first transformation matrix,
wherein a plurality of correlation elements are generated, and
wherein the plurality of correlation elements are subject to a second matrix multiplication to generate a plurality of transformed correlation elements, the plurality of transformed correlation elements being dependent on an extent of correlation between the plurality of correlation elements.

2. The apparatus of claim 1, wherein the at least one transformation operation involves all of the first plurality of signal elements and all of the second plurality of signal elements.

3. The apparatus of claim 2, wherein the plurality of transformed correlation elements are used to provide an encoding of residual elements for the representation of the signal, the residual elements being used to generate a reconstruction of the signal for a given level of quality.

4. The apparatus of claim 3, wherein the plurality of transformed correlation elements are used to weight the encoding of the residual elements based on a determined measure of importance.

5. The apparatus of claim 3, wherein the apparatus is configured to use encoding parameters that are determined based on positions of the correlation elements with respect to the signal.

6. The apparatus of claim 1, wherein one or more of the plurality of correlation elements and the plurality of transformed correlation elements are quantized.

7. A method comprising:
obtaining a first plurality of signal elements relating to a first part of a representation of a signal at a first level of quality, the first part of the first representation of the signal being derivable from signal elements from a representation of the signal at a second level of quality, the second level of quality being lower than the first level of quality;
obtaining a second plurality of signal elements relating to a second, different part of the representation of the signal at the first level of quality, the second part of the representation being derivable from a different set of signal elements in the representation of the signal at the second level of quality; and
performing at least one transformation operation involving at least one signal element in the first plurality of signal elements and at least one signal element in the second plurality of signal elements to generate at least one correlation element, the at least one correlation element being dependent on an extent of correlation between the at least one signal element in the first plurality of signal elements and the at least one signal element in the second plurality of signal elements, wherein the at least one transformation operation comprises at least one matrix multiplication operation involving at least a first transformation matrix, wherein a plurality of correlation elements are generated, and wherein the plurality of correlation elements are subject to a second matrix multiplication to generate a plurality of transformed correlation elements, the plurality of transformed correlation elements being dependent on an extent of correlation between the plurality of correlation elements.

8. The method of claim 7, wherein the at least one transformation operation involves all of the first plurality of signal elements and all of the second plurality of signal elements.

9. The method of claim 8, wherein the plurality of transformed correlation elements are used to provide an encoding of residual elements for the representation of the signal, the residual elements being used to generate a reconstruction of the signal for a given level of quality.

10. The method of claim 9, wherein the plurality of transformed correlation elements are used to weight the encoding of the residual elements based on a determined measure of importance.

11. The method of claim 9, wherein the encoding parameters are determined based on positions of the correlation elements with respect to the signal.

12. The method of claim 7, wherein one or more of the plurality of correlation elements and the plurality of transformed correlation elements are quantized.

13. A non-transitory computer-readable medium having stored thereon computer-executable instructions which, when executed by at least one processor, cause the processor to perform the following:

obtain a first plurality of signal elements relating to a first part of a representation of a signal at a first level of quality, the first part of the first representation of the signal being derivable from signal elements from a representation of the signal at a second level of quality, the second level of quality being lower than the first level of quality;

obtain a second plurality of signal elements relating to a second, different part of the representation of the signal at the first level of quality, the second part of the representation being derivable from a different set of signal elements in the representation of the signal at the second level of quality; and perform at least one transformation operation involving at least one signal element in the first plurality of signal elements and at least one signal element in the second plurality of signal elements to generate at least one correlation element, the at least one correlation element being dependent on an extent of correlation between the at least one signal element in the first plurality of signal elements and the at least one signal element in the second plurality of signal elements, wherein the at least one transformation operation comprises at least one matrix multiplication operation involving at least a first transformation matrix, wherein a plurality of correlation elements are generated, and wherein the plurality of correlation elements are subject to a second matrix multiplication to generate a plurality of transformed correlation elements, the plurality of transformed correlation elements being dependent on an extent of correlation between the plurality of correlation elements.

14. The computer-readable medium of claim 13, wherein the at least one transformation operation involves all of the first plurality of signal elements and all of the second plurality of signal elements.

15. The computer-readable medium of claim 13, wherein the plurality of transformed correlation elements are used to provide an encoding of residual elements for the representation of the signal, the residual elements being used to generate a reconstruction of the signal for a given level of quality.

16. The computer-readable medium of claim 15, wherein the plurality of transformed correlation elements are used to weight the encoding of the residual elements based on a determined measure of importance.

17. The computer-readable medium of claim 13, wherein the processor is configured to use encoding parameters that are determined based on positions of the correlation elements with respect to the signal.

18. The computer-readable medium of claim 13, wherein one or more of the plurality of correlation elements and the plurality of transformed correlation elements are quantized.

* * * * *